United States Patent [19]

Keller et al.

[11] 4,400,320

[45] Aug. 23, 1983

[54] ALKYLENEOXY FUGITIVE TINTS CONTAINING A 2-AMINO, 6-METHOXY BENZATHIAZOLE GROUP AND PROCESS FOR PREPARING SUCH FUGITIVE TINTS

[75] Inventors: Margaret S. Keller, Inman; Ralph N. Brendle, Spartanburg, both of S.C.

[73] Assignee: Milliken Research Corporation, Spartanburg, S.C.

[21] Appl. No.: 282,456

[22] Filed: Jul. 13, 1981

[51] Int. Cl.³ .................. C09B 29/09; C09B 46/00; C09B 69/00

[52] U.S. Cl. ........................ 260/158; 8/403; 260/141; 564/305; 564/390

[58] Field of Search .......... 260/152, 158, 162, 163, 260/164, 174, 178, 184, 198, 199, 200, 201, 202, 205, 206, 207, 207.1, 207.5, 144; 8/403

[56] References Cited

U.S. PATENT DOCUMENTS

| | | | |
|---|---|---|---|
| 3,154,535 | 10/1964 | Graham | 260/198 |
| 3,157,633 | 11/1964 | Kuhn | 260/200 |
| 3,337,525 | 8/1967 | Peters et al. | 260/200 |
| 3,449,319 | 6/1969 | Kuhn | 260/207.5 |
| 4,113,721 | 9/1978 | Hauser et al. | 260/178 |
| 4,167,510 | 9/1979 | Brendle | 260/174 |

Primary Examiner—Floyd D. Higel
Attorney, Agent, or Firm—H. William Petry; Terry T. Moyer

[57] ABSTRACT

Fugitive tints are provided which are characterized by the formula:

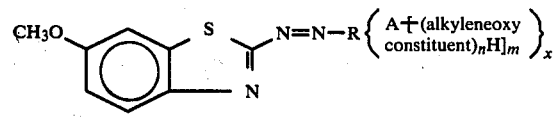

where R is selected from meta-toluidene, meta-amino phenol, aniline or dimethoxy aniline A is selected from N, O, S, or $CO_2$; the alkylene group of the alkyleneoxy constituent contains from 2 to about 4 carbon atoms; n is an integer of from 2 to about 300; m is 1 when A is O, S, or $CO_2$, and 2 when A is N; x is an integer of from 1 to about 5; and the product of n times m times x (n·m·x) is from 2 to about 400. Also provided is a process for preparing alkyleneoxy fugitive tints.

5 Claims, No Drawings

ALKYLENEOXY FUGITIVE TINTS CONTAINING A 2-AMINO, 6-METHOXY BENZATHIAZOLE GROUP AND PROCESS FOR PREPARING SUCH FUGITIVE TINTS

This invention relates to fugitive tints. In one aspect it relates to fugitive tints containing the 2-amino, 6-methoxy benzathiazole moiety having improved heat stability, light stability, and fugitivity characteristics. In yet another aspect, it relates to a process for preparing such fugitive tints.

In order to identify synthetic and natural fibers during textile processing operations such as spinning and weaving, the fibers may be marked or color-coded with a tint which can be easily removed at the desired time during some subsequent operation. Such tints, which may have a wide variety of applications, are generally referred to as fugitive tints.

Fugitive tints which have achieved wide acceptance in the textile industry are the polyethylene oxide tints described in U.S. Pat. No. 3,157,663. Such tints are a combination of a dyestuff radical and one or more polyethyleneoxy groups. Dyestuff radicals disclosed in the patent include nitroso, nitro, azo, diphenylmethane, triphenylmethane, xanthene, acridene, methine, thiazole, indamine, azine, oxazine, or anthraquinone radicals. Preferably, such radicals are attached to the polymeric constituents of the tint compositions by an amino nitrogen.

Fugitive tints of the type disclosed in U.S. Pat. No. 3,157,663, incorporated by reference, have generally been classified as water fugitive or solvent fugitive. For example, tints containing one or more polyethyleneoxy groups wherein the polyethyleneoxy group contained at least 20 repeating ethyleneoxy units in the molecule are generally considered water fugitive tints; whereas, tints containing one or more polypropyleneoxy groups having similar repeating propyleneoxy units in the molecule are considered solvent fugitive. Thus, the choice of tints have depended largely upon the finishing operations of the fiber and the fugitivity properties of the tint.

Desirably, such fugitive tints should be capable of being easily and substantially completely removed even after exposure to extreme conditions which may be encountered during processing of the textile material which has been so color coded. In addition, the tint should have good color stability to minimize fading during exposure to heat and/or light, which may occur during processing of the tinted fibers prior to the intentional removal of the tint during the desired textile processing stage.

While fugitive tints having the aforementioned desirable characteristics have been produced in a wide variety of shades, deficiencies in heat and/or light stability or in universal fugitivity characteristics have been apparent for the red, and blue or purple colors and, of course, in other shades where these colors are typically employed. For instance, such colors may be especially important in producing other shades of tints such as brown, grey, green, and orange.

Accordingly, it would be very desirable to produce fugitive tints which have a high degree of fugitivity to textile fibers and which have satisfactory light and heat stability characteristics. It is also desirable to provide red fugitive tints which are a "truer" red than those tints previously available and which, accordingly, provided blended shades of tints having a brighter, truer color.

The tints of the present invention have the following general formula:

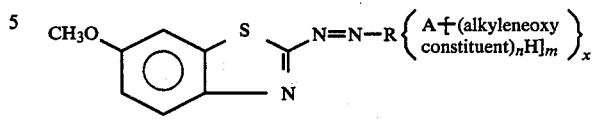

where R is selected from meta-toluidene, meta-amino phenol, aniline or dimethoxy aniline; A is selected from N, O, S, or $CO_2$; the alkylene group of the alkyleneoxy constituent contains from 2 to about 4 carbon atoms; n is an integer of from 2 to about 300; m is 1 when A is O, S, or $CO_2$, and 2 when A is N; x is an integer of from 1 to about 5; and the product of n times m times x (n·m·x) is from 2 to about 400.

Preferred among the compounds of the above formula are those where A, the linking moiety of the organic dyestuff molecule, is an amino nitrogen. Also, the R constituent may preferably be selected from meta-toluidine, meta-amino phenol and aniline moieties where a red dye is desired and a 2,5 dimethoxy aniline moiety where a purple dye is desired.

The alkylene moiety, as mentioned, may contain from about 2 to 4 carbon atoms. Where water fugitivity is desired, generally the alkylene moiety may be entirely or substantially entirely comprised of two carbon atoms. Where other properties such as non-polar solvent fugitivity are desired, the alkylene moiety may contain more than two carbon atoms. Thus, alkyleneoxy copolymers, such as ethyleneoxy-propyleneoxy copolymers, ethyleneoxy-butyleneoxy copolymers, or block copolymers thereof can be employed as the alkyleneoxy constituent of the fugitive tints of the present invention. When employing an ethyleneoxy-propyleneoxy copolymer according to a preferred embodiment where, for instance, both non-polar solubility and water solubility are desired, the ethyleneoxy units generally may comprise from about 25 to about 75 mole percent of the polymer chains with the propyleneoxy units being the remainder.

The present invention also relates to a process by means of which the fugitive tints of the invention may be prepared. According to such process, a suitable intermediate, e.g., an aromatic compound containing from about 6 to about 20 carbon atoms and at least one suitable linking moiety, is converted in a first step into a corresponding alkyleneoxide-containing compound. Such conversion may be accomplished quite readily by simply bubbling an appropriate alkylene oxide through a reactor containing the aromatic compound in the liquid phase. If the aromatic compound is a solid at ambient conditions of temperature and pressure, it may be heated to provide it in the liquid phase for reaction with the alkylene oxide. Upon reaction of the appropriate number of alkylene oxide equivalents, formation of the corresponding hydroxyalkylated compound will typically have been completed. Typical of such hydroxyalkylated compounds are, for instance, N,N-dihydroxy ethyl-aminophenol; N,N-dihydroxy ethyl-aniline; and N,N-dihydroxyethyl-2,5-dimethoxyaniline.

The corresponding hydroxyalkylated compound may then be reacted with further quantities of alkylene oxide by adding an appropriate basic catalyst to the reactor, e.g., potassium hydroxide, and then adding further quantities of alkylene oxide to obtain the desired alkyleneoxy constituent for the hydroxyalkylated compound and, ultimately, the fugitive tint.

In a separate step, a diazo compound may be formed by reacting a diazo precursor compound, e.g., 2-amino, 6-methoxy benzathiazole with suitable diazo-forming reactants such as nitrosylsulfuric acid in the presence of, for instance, a strong mineral acid, e.g., phosphoric acid, sulfuric acid, etc., under appropriate conditions of temperature, e.g., from about −20° C. to about 10° C., preferably about −10° C. to about 5° C., and pressure, typically atmospheric pressure, with suitable agitation.

The presence of large amounts of water, for instance, about 10 percent or more by weight based upon the weight of the reaction mixture may not be desirable during formation of the diazo since such quantities of water may break down the diazo-forming compound or compounds, e.g., nitrosylsulfuric acid, present in the reaction mixture resulting in undesirably low yields of diazo compound. On the other hand, in the absence of a polar solvent, the reaction mixture may become extremely viscous at the desired reaction temperatures, causing poor heat transfer throughout the mixture so that sections of the mixture may rise to undesirably high temperatures of, for instance, above 5° or 10° C., causing decomposition of the desired diazo compound. Accordingly, the presence of appropriate quantities of a strong mineral acid, such as phosphoric or sulfuric acid, in the reaction mixture is recommended to lower the viscosity of the reaction mixture during diazo formation to less than about 12,000 centipoises as determined by a Brookfield viscometer Model LV No. 4 spindle at 30 speeds. Typically, the amount of strong mineral acid provided may be from about 0.1 to about 1 part by weight, based on the amount of 2-amino, 6-methoxy benzathiazole present. While strong mineral acid has heretofore been suggested for use as a solvent in the diazotization reaction to prepare dyestuffs, that is non-water-soluble material, typically it is employed in much larger quantities than used in the present invention. If such large quantities were to be employed in the preparation of a fugitive tint, it would be necessary as a practical matter to neutralize the acid after coupling the diazo with the aromatic group containing moiety resulting in the presence of large and undesirable amounts of inseparable, water-soluble V salts in the product fugitive tint. The presence of such salts in the product would render it undesirable for use in, for instance, textile processing operations due to corrosion problems, buildup of salt deposits on the equipment, and incompatibility with other fiber finishes typically employed in textile finishing operations. Typically the amount of such salts in the fugitive tint product should be such that the ash level in the product is less than about 3 percent, preferably less than about 1 percent based on the total weight of the fugitive tint product which generally contains the tint compound in an amount of from about 10 percent to 30 percent in an aqueous solution.

External cooling of the reaction may be required to maintain the desired temperature of the reaction mixture during the exothermic reaction. Also, temperature control of the reaction mixture may further be controlled by charging the 2-amino, 6-methoxy benzathiazole to the reaction vessel containing the other reactants at a rate to maintain the temperature of the reaction mixture in the desired range.

The reaction by means of which the diazo compound may be formed according to the invention may be represented as follows:

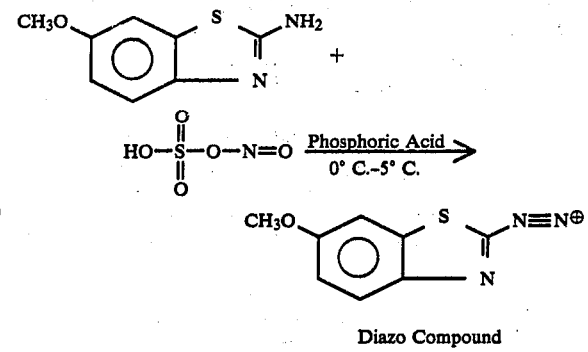

Diazo Compound

After formation of the diazo compound and the alkyleneoxy substituted aromatic compound, the diazo compound is then coupled to the alkyleneoxy substituted aromatic compound to form the product fugitive tint compound. Such coupling may be conveniently accomplished by first diluting the alkyleneoxy-substituted aromatic compound, especially if it is a solid, with water. The solution may then be added to a suitable reaction vessel wherein the pH may be adjusted to from about 2 to about 4 by adding a suitable acid such as sulfuric acid. Then the reaction mixture may be cooled to from about −10° C. to about 20° C., preferably 0° C. to 10° C., whereupon the diazo compound may be added with agitation of the reaction mixture in an amount of from about 0.005 part to about 1 part by weight, preferably about 0.01 to about 0.1 part by weight based upon the weight of alkyleneoxy-substituted aromatic compound present in the reaction mixture. Then if desired, the pH of the crude reaction product may be adjusted to stabilize the product to a neutral or slightly basic pH and additional water may be added to achieve the desired concentration of the final product.

Typical alkylenoxy-substituted aromatic compounds with which diazo compound may be coupled include the following compounds where n has the value set forth above:

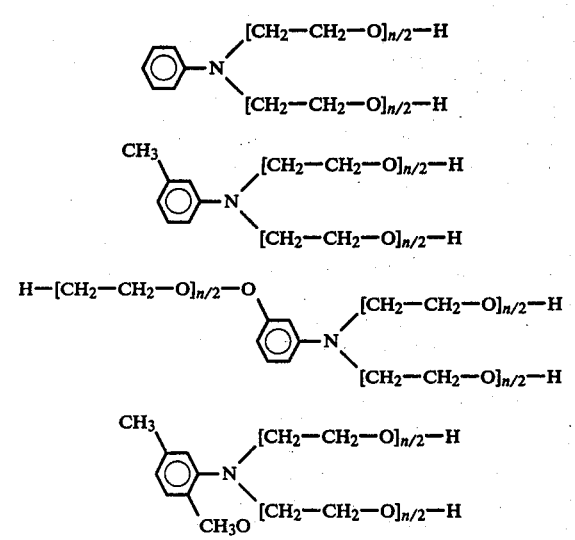

Compounds I, II, and III above may be coupled with the diazo compound to provide a red fugitive tint. Compound IV may be coupled to provide a purple fugitive tint.

The following examples are given to illustrate the preparation and use of novel fugitive tint compositions of the present invention; however, it is to be understood that such examples are for illustrative purposes only and are not to be construed as unduly limiting the scope of the present invention.

EXAMPLE 1

A dye intermediate was prepared by bubbling ethylene oxide into 107 grams molten meta-toluidene at 150° C. and 50 psig until two molar equivalents of ethylene oxide were absorbed. There was thus produced 195 grams of the compound N,N-dihydroxyethyl-m-toluidene. Two grams potassium hydroxide were then added to the above product, followed by 228 moles ethylene oxide, resulting in a total of about 10,227 grams of a 230 molar meta-toluidene product of the formula corresponding to formula II above were n is 230.

EXAMPLES 2-4

Example 1 was repeated to prepare dye intermediates corresponding to formulae I (Example 2), III (Example 3), and IV (Example 4) above, where n in each instance is 230.

EXAMPLE 5

Ninety two grams of nitrosylsulfuric acid and 10 grams of phosphoric acid were charged to a 250-milliliter glass vessel, which was provided with good agitation and cooling capacity. This reaction mixture was cooled to 0° C., whereupon 48 grams of 2-amino, 6-methoxy benzathiazole were charged to the mixture of acids at a rate to maintain the temperature in the range of 0° C. to 5° C. A solution weighing 150 grams containing the diazo product was prepared.

EXAMPLE 6

Two thousand nine hundred thirty two grams of a solid, active intermediate made according to Example 1 were diluted with water to a concentration of 55 percent by weight and charged to a vessel with cooling capacity and agitation capability. The pH of the solution was adjusted to 2.8 to 3.2 by adding concentrated sulfuric acid. The mixture was then cooled to 0°-5° C., whereupon 150 grams of the diazo-containing solution prepared in Example 5 which was estimated to contain 51.2 grams of actual diazo product were added over a five-minute period. The pH was adjusted to 7.5 to 8.5 with sodium hydroxide and 12,500 grams of water were added. The product obtained was a red fugitive tint having an absorptivity (visible spectrum) of 0.6±0.05.

EXAMPLE 7

A red fugitive tint, substantially identical to the commercially available Versatint ® Red N-6 Fugitive Tint sold by Milliken Chemical of Inman, SC, was prepared according to the procedure set forth in Example 5 of U.S. Pat. No. 3,157,633. The product compound had the following structure:

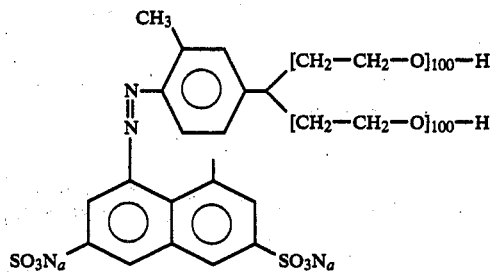

EXAMPLE 8

Three hundred forty grams of a fugitive tint prepared according to the procedure set forth in Examples 1, 5, and 6 diluted in 150 gallons of water were applied to 300 pounds of Nylon 6 fiber by means of a spray nozzle as the fiber was being blended. The fibers containing the yarn were processed into yarn. A portion of these fibers was subjected to typical steam autoclaving conditions normally encountered in the manufacture of carpeting, i.e., temperature of 270° F. for about 30 minutes. The yarn was then tufted into a carpet backing, scoured with water at 75° F. for 30 seconds, and all observable color provided by the tint was removed.

EXAMPLE 9

The procedure of Example 8 was repeated with the exception that the tint employed was that prepared according to Example 7. After scouring, the yarn was estimated by observation to have retained about 10 to 20 percent of the color of the tint originally imparted to the yarn.

EXAMPLE 10

A remaining sample of yarn tinted with the tint prepared according to Examples 1, 5, and 6 was run side by side with a sample tinted in the same manner with the tint of Example 7 through a heatsetting apparatus (dry heat conditions) where the yarns were subjected to an identical temperature of 400° F. for one minute. The yarn tinted with the tint of Examples 1, 5, and 6 remained red with only slight observable color change, while that of comparative Example 7 changed to a beige color. This color change may result in problems when the yarn is further processed. Namely, the yarn may not be identifiable by its fugitive color which is the purpose of a fugitive tint in textile processing, but rather, if its color has changed, it may be confused with yarns emanating from a different source or batch or even yarns of different chemical composition.

After heatsetting, each of the yarns was scoured with water at 75° F. for 30 seconds. The yarn tinted with the tint of Examples 1, 5, and 6 showed no observable remaining traces of the tint. The yarn tinted with the tint of Example 7 remained noticeably stained.

EXAMPLE 11

Three samples of nylon fibers were prepared. Sample A was tinted with a commerical blue fugitive tint, Versatint ® Blue N-6 sold by Milliken Chemical. Sample B was tinted with a purple tint, Versatint ® Purple N-6 of Milliken Chemical and Sample C was tinted with a purple tint prepared according to Examples 1, 5, and 6. All of the samples were then exposed to fluorescent light at a distance of about thirty inches from the source. After 4 days no color was visible on the fiber of Sample A. After 14 days, the color of Sample B had shifted to a reddish, significantly lighter color. Sample C had no significant color change after 21 days.

What is claimed is:

1. A compound of the formula:

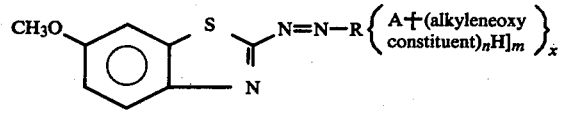

where R is selected from meta-toluidene, meta-amino phenol, aniline or dimethoxy aniline; A is selected from N, O, S, or $CO_2$; the alkylene group of the alkyleneoxy constituent contains form 2 to about 4 carbon atoms; n is an integer of from 2 to about 300; m is 1 when A is O, S, or $CO_2$, and 2 when A is N; x is an integer of from 1 to about 5; and the product of n times m times x (n·m·x) is from 2 to about 400.

2. The fugitive tint of claim 1 wherein said alkylene constituent is selected from the group consisting of ethylene oxide, propylene oxide, and copolymers thereof.

3. The fugitive tint of claim 1 wherein A is N, said alkylene constituent is ethyleneoxy.

4. The fugitive tint of claim 1 wherein A is N, said alkylene constituent is ethyleneoxy, and R is a 2,5 dimethoxy aniline group.

5. The fugitive tint of claim 1 wherein A is N, said alkylenoxy constituent is ethyleneoxy and R is a meta-toluidene group.

* * * * *